United States Patent

Frank

[15] 3,694,800

[45] Sept. 26, 1972

[54] ACOUSTICAL GAUGE

[72] Inventor: Lee Fitzpatrick Frank, Rochester, N.Y.

[73] Assignee: Eastman Kodak Company, Rochester, N.Y.

[22] Filed: April 24, 1970

[21] Appl. No.: 31,708

[52] U.S. Cl. .............................340/1 R, 181/0.5 NP
[51] Int. Cl. ................................................G01s 9/68
[58] Field of Search....340/1, 3, 3 D, 3 FM, 1 R, 3 R; 181/0.5 NP

[56] References Cited

UNITED STATES PATENTS

| | | | |
|---|---|---|---|
| 3,500,951 | 3/1970 | Beeken | 181/0.5 |
| 3,019,430 | 1/1962 | Pedersen et al. | 343/12 |
| 2,016,906 | 10/1935 | Rice | 181/0.5 |
| 2,985,018 | 5/1961 | Williams | 340/1 |

*Primary Examiner*—Richard A. Farley
*Attorney*—W. H. J. Kline, Paul R. Holmes and J. William Berkstresser

[57] ABSTRACT

An acoustical gauge is disclosed for measuring the distance between an acoustic wave transmitting and receiving or sensing port and the surface of a material. One device disclosed comprises a Y-shaped tube where the bottom of the Y ends in the sensing port. During operation of the gauge, an acoustic wave is produced in the first branch of the Y, travels to the intersection point of the branches and then propagates down the stem, i.e., the channel which is the bottom of the Y and out the sensing port. As the standing wave encounters the hydraulic impedance created by the distance between the sensing port and location of the reference surface near the sensing port, a complex interaction of standing and travelling waves are set up. At the Y intersection a resultant wave formed by the interference of the original wave produced with the feedback from the hydraulic impedance encountered at the sensing port, is investigated and measured for phase or amplitude variation. These measurements can be calibrated in terms of distance between the sending port and the reference surface.

12 Claims, 7 Drawing Figures

LEE F. FRANK
INVENTOR

LEE F FRANK
INVENTOR

LEE F. FRANK
INVENTOR

LEE F FRANK
INVENTOR

ACOUSTICAL GAUGE

BACKGROUND OF THE INVENTION

1. Field of the Invention

This invention relates to a method of gauging and more particularly to an acoustical measuring device incorporating acoustical interference for obtaining information useful for accurately measuring the distance from a gauge to a reference surface.

2. Description of the Prior Art

Many types of distance measuring gauges have been utilized in product quality control and the like. In particular, non-destructive gauging, measuring and testing devices have become very important to industry, particularly with materials which are susceptible to alteration, damage or destruction by current testing or measuring devices. For example, photosensitive materials and the like are susceptible to alteration and damage during conventional measuring, gauging the testing.

To avoid some of the problems encountered in this area a number of different measuring or gauging schemes utilizing acoustic energy have been employed in the machine tool art and in liquid level control. In general, these systems have fallen into three categories. In one system, the elapsed time between the transmission of a pulse of acoustic energy and the receipt of an echo pulse is utilized to measure the distance between the transmitter and the echo surface. In a second system frequency shift between transmitted and reflected frequency modulated acoustic waves is measured and the distance determined thereby. In a third system the phase of the transmitted and reflected waves is compared and the incremental distance measured thereby.

While use of these acoustical systems eliminates the disadvantages associated with the use of mechanical or optical gauges, extreme accuracy has not been achieved with any of these acoustical systems because of dependency of the accuracy of the measurement upon the wavelength of the acoustical energy used and upon atmospheric conditions between the measuring port and the material. Devices which utilize separate transmitting and receiving transducers must be positioned a relatively large distance from the surface of the material and thereby are extremely sensitive to atmospheric conditions. Devices which utilize single means for transmission and receiving, and thereby minimize sensitivity to atmospheric conditions, have incorporated moving parts with an associated increase in cost and reduction in accuracy.

It is accordingly an object of this invention to produce a reliable acoustical gauge which exhibits extremely high accuracy substantially independent of atmospheric conditions. It is a further object to produce such a device which is low in cost, extremely simple to construct and use and may be used to measure distances to either solid or liquid surfaces which are close to the gauge housing.

SUMMARY OF THE INVENTION

According to this invention, an acoustic wave is produced by a driving transducer and propagates down one branch of a Y-shaped tube to the joint in the Y-shaped tube. This acoustic wave is then divided into two parts, one part travelling down the tube towards the wave transmitting and receiving, i.e., the sensing port, and the second part towards the acoustical receiving transducer. As the acoustic wave encounters the hydraulic impedence created by the distance therefor. between the exit end of the sensing port and the reference surface, a complex interaction of standing and travelling waves is fed back to the joint in the Y-shaped tube. At that point interference between the original wave and the feedback produces a resultant wave. The resultant wave then impinges upon the acoustical receiving transducer. The resultant signal is amplified and electronically processed to retrieve and indicate intelligence from the phase or amplitude differences between the original wave and the feedback produced by the original waves encounter with the hydraulic impedence at the sensing port. Distance information may be obtained directly from an analysis of either the phase or amplitude of the resultant wave.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
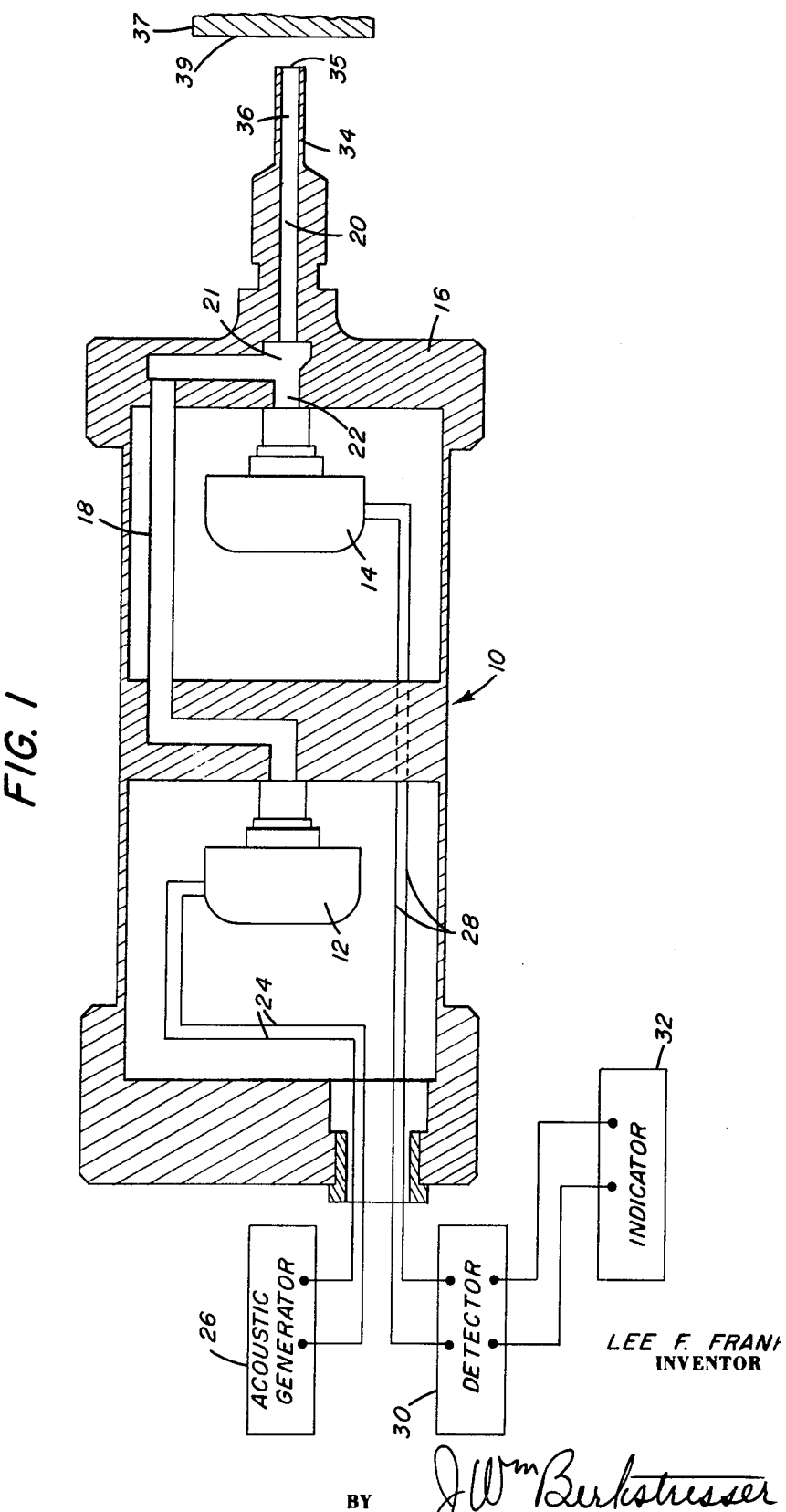
FIG. 1 is a schematic illustration of the acoustical gauging device of this invention.

With reference to FIG. 1, the acoustical gauge generally shown as 10, consists of a transmitting transducer 12, a receiving transducer 14, and a casing 16, in which is formed a transmitting wave channel 18, sensing channel 20 and resultant wave channel 22. Transmitting transducer 12 is connected by means of electrical leads 24 to a suitable acoustic wave generator 26. Receiving transducer 14 is connected by electrical leads 28 to suitable detector means 30 which is then coupled to a suitable distance indicator 32. Tip 34 ends in sensing port 35 and contains an interior channel 36 adapted to be coaxial with sensing channel 20 in casing 16. The distance from junction 21 to sensing port 35 within channel 36 is determined by the wavelength ($\lambda$) of the acoustic wave being utilized in the gauge. The distance is an odd multiple of $\lambda/4$, i.e., $\lambda/4$, $3\lambda/4$, $5\lambda/4$, etc. Object 37 is placed with reference surface 39 positioned with respect to the sensing port 35 so as to reflect or feedback alterations caused in the wave from transmitting transducer 12 after it encounters the hydraulic impedence of the gap between reference surface 39 and sensing port 35.

In operation, acoustic wave generator 26 drives transmitting transducer 12 so that a continuous acoustic wave is transmitted into channel 18. Upon arrival at the junction 21 of transmitting channel 18 and sensing channel 20, the acoustic wave divides, with a portion being transmitted through resultant wave channel 22 to the receiving transducer 14. The remainder of the acoustic wave is transmitted down sensing channel 20 and interior channel 36 to sensing port 35 at the end of tip 34.

The hydraulic impedence caused by the gap between the sensing port 35 and the reference surface 39 will cause an alteration in the acoustic wave in sensing channel 18 which is independent of atmospheric conditions and varies linearly over a useful range of distances from the sensing port 35 and the reference surface 39.

The alteration hereinbefore described is best sensed by the production of a resultant wave by the interference of the feedback with a portion of the original acoustic wave. The difference between either the amplitude or phase of the two waves is then heightened in the resultant wave.

The amplitude and phase of the resultant wave are then related to the distance between sensing port 35 and surface 39 of object 37. For example, if sensing port 35 is in virtual contact with surface 39, the feedback wave will be one-half wavelength out of phase with the original wave when they interfere in resultant channel 22 because the wave travels an extra distance of one-quarter wavelength down and one-quarter wave-length back through channel 20. A minimum amplitude signal will be produced in receiving transducer 14. In addition, the phase of the resultant wave will be dependent upon the relative phases of the original and feedback waves which are 90° out of phase and will thus be different from the original wave. Accordingly, either the amplitude or the phase of the resultant wave may be determined and correlated with object distance. As the distance between sensing port 35 is touching surface 39, and the resultant amplitude and phase will therefore be different. The amplitude will increase as the sensing port-object distance increases as the minimum signal will be received when the feedback wave is one-half of a wavelength out of phase with the original wave, the condition which exists when the sensing port is touching the object.

Many electrical circuits may be used to drive transmitting transducer 12 or to analyze the intelligence impressed upon receiving transducer 14 and may thus be employed in this invention. The electrical diagrams shown in FIGS. 2–6 are merely illustrative and are used to demonstrate the use of the invention.

Figure 2:
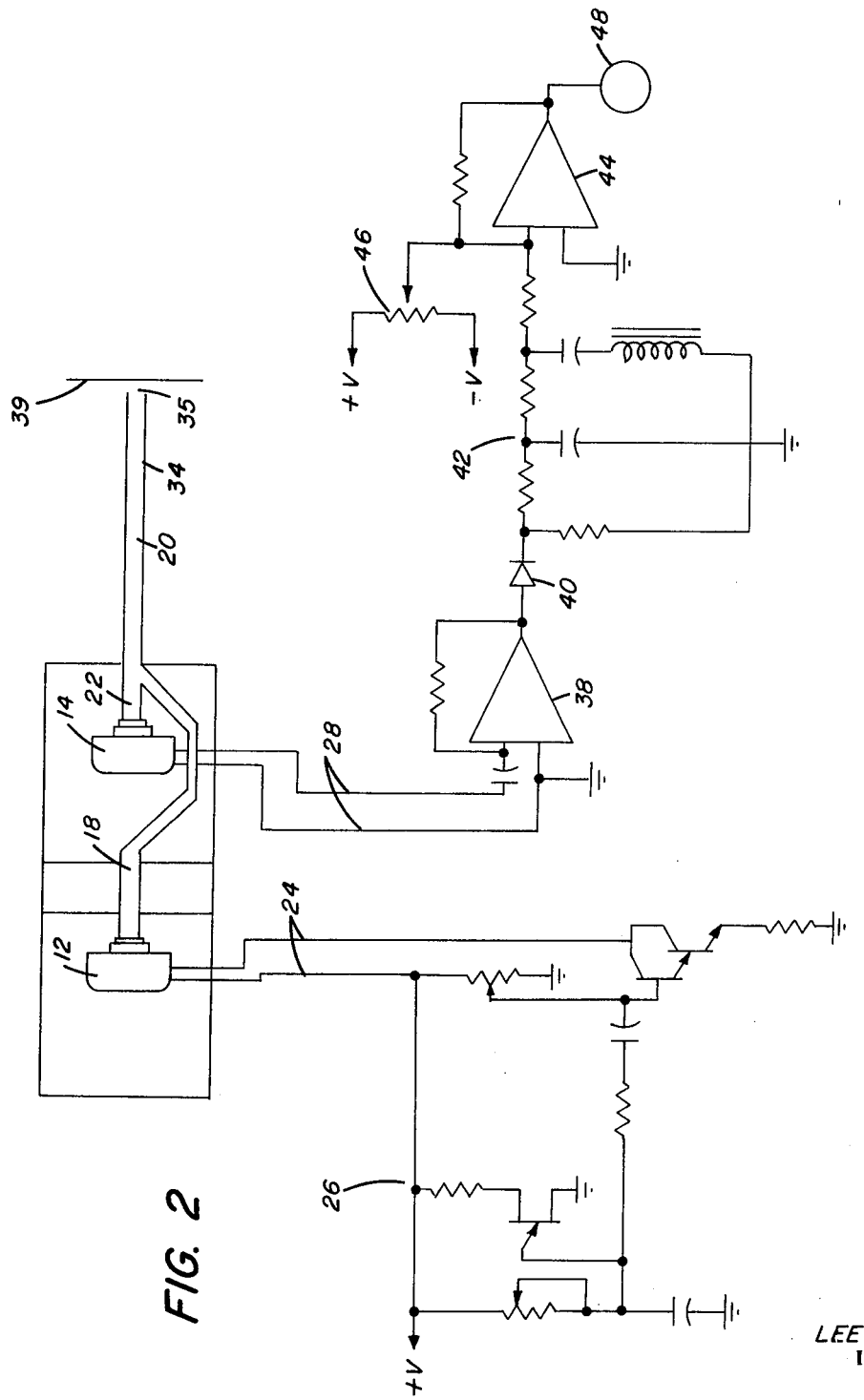
FIG. 2 is a schematic representation of one embodiment of this invention utilizing amplitude detection.

FIG. 2 illustrates an electrical circuit which incorporates amplitude detection in this invention. An oscillator 26 is coupled to the input of transmitting transducer 12. The acoustic wave generated by transducer 12 travels through channel 18, down channel 20 through tip 34 and is reflected back to channel 22. The resultant signal, after interference of the original and feed waves at receiving transducer 14, is then amplified by amplifier 38, fed through diode 40, and through a filtering network shown generally at 42. The output of filter network 42 is a D.C. voltage having practically none of the original carrier frequency of oscillator 26. This voltage is amplified by amplifier 44 which has an arbitrary bias voltage fed into it by resistor 46 for the establishment of an arbitrary zero condition. The amplified voltage is then displayed on any conventional indicating means, such as voltmeter 48.

Figure 3:
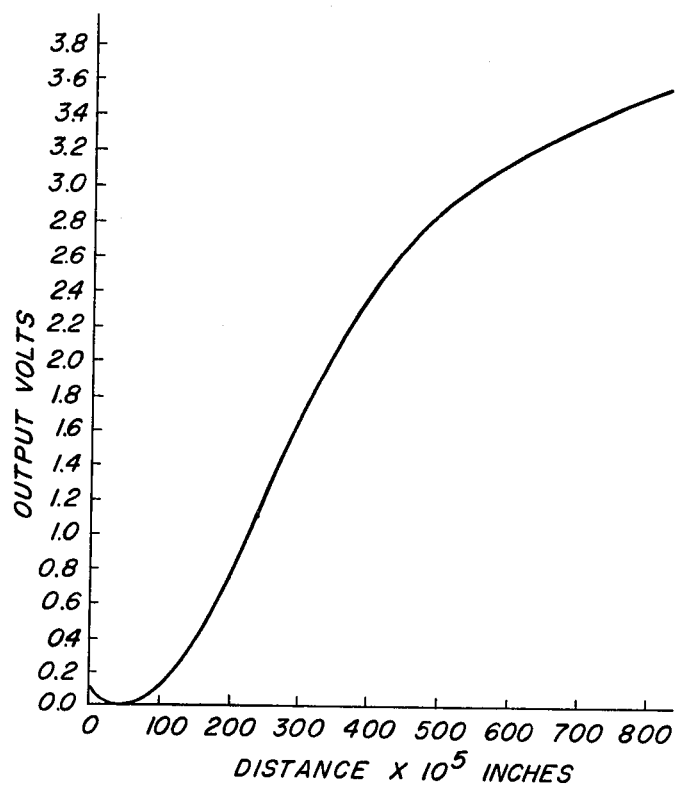
FIG. 3 is a calibration curve for the embodiment of FIG. 2.

FIG. 3 shows a calibration curve for the acoustical gauge shown in FIG. 2. An oscillator 26 was used to generate a 2,200 hertz signal. The gain of amplifiers 38 and 44 was adjusted to yield 1 volt output per 0.001 inch object distance with a minimum signal when the sensing port 35 was touching surface 39. The gauge exhibits essentially a zero response out to about 0.0005 inches. Beyond that, the response is fairly linear up to about 0.004 inches. A linear response is also obtained between approximately 0.0006 inches and 0.011 inches.

Figure 4:
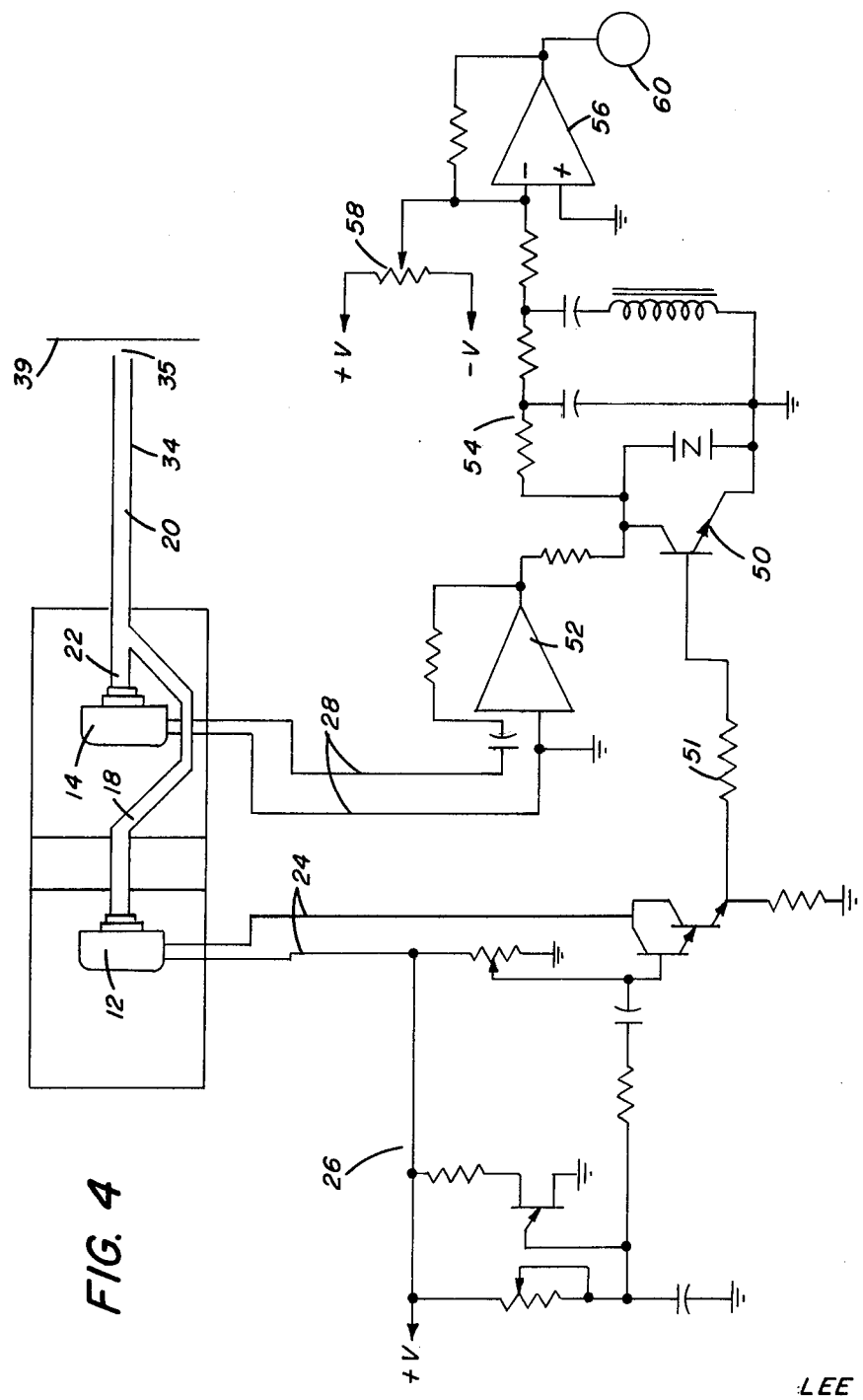
FIG. 4 is a schematic representation of another embodiment of this invention utilizing phase detection of the resultant wave.

In the embodiment shown in FIG. 4, the phase of the resultant wave is analyzed to obtain the object-sensing port distance. The same oscillator circuit 26 is utilized as with amplitude detection. In addition to driving the transmitting transducer 12, the output from oscillator 26 is coupled to phase detector 50 by means of resistor 51. The output of receiver transducer 14 as produced by the resultant wave is amplified by amplifier 52 and then fed to phase detector 50. The output of phase detector 50 is then filtered by filtering network 54 to remove the carrier frequency. The resultant voltage has practically none of the original carrier frequency and is amplified by amplifier 56. Amplifier 56 has an arbitrary zero condition which may be set by resistor 58. The output of amplifier 56 is then fed to any conventional indicating means, such as a voltmeter 60. Phase determination is independent of the amplitude of oscillator 26 so that resultant distance determination does not require a highly stable oscillator. The output as shown on indicator 60 is calibrated for variations in distance of object to sensing port 35.

Figure 5:
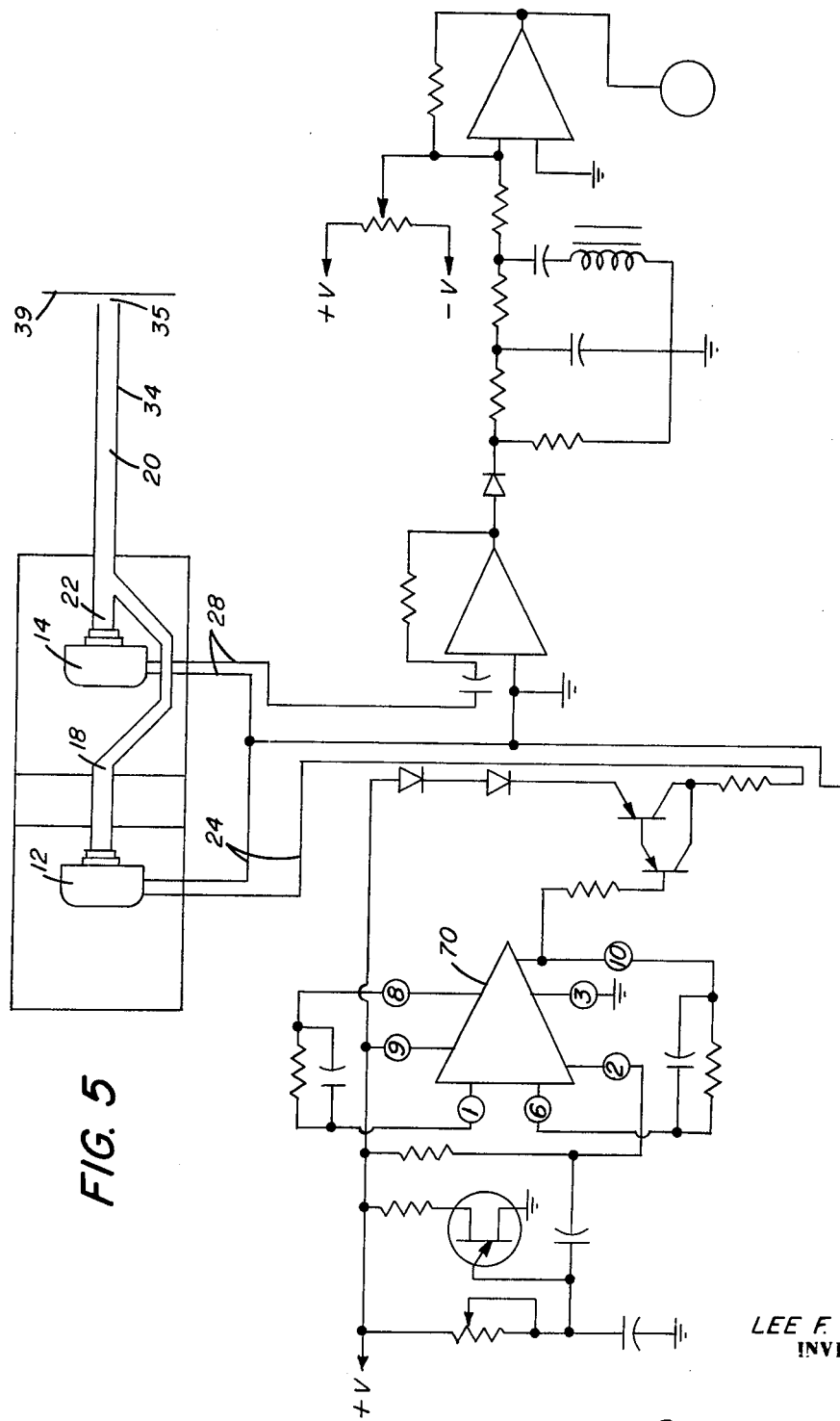
FIG. 5 is a schematic representation of a modification of this invention which may be incorporated into the devices shown in FIGS. 2 and 4.

The oscillator 26 used in this invention as illustrated in FIGS. 2 and 4 may be modified as shown in FIG. 5 by the addition of an amplifier stage 70. This results in a stage of gain in input power to transmitting transducer 12 with increased stability in the amplitude of the driving voltage and a reduction in energy converted into unwanted harmonics. The result is increased stability and sensitivity in distance measurement.

Figure 6:
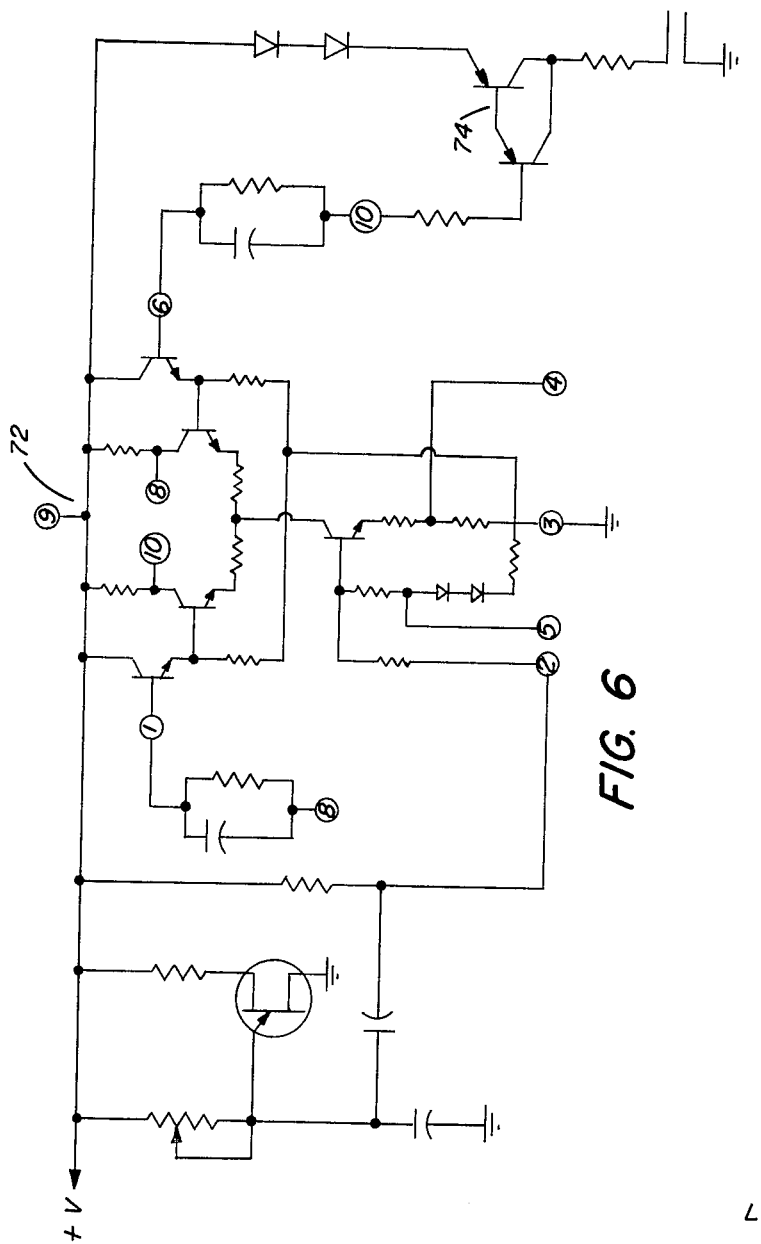
FIG. 6 is a schematic representation of a modification of the device shown in FIG. 5 which produces increased stability and sensitivity.

The preferred embodiment of this invention incorporates an amplifier stage 70 in oscillator 26 as shown in FIG. 5, with the amplifier stage connected as flipflop configuration amplifier 72 as demonstrated in FIG. 6. The flipflop configuration amplifier 72 is utilized to drive transistor power amplifier 74 in such a way that a very stable square wave is transmitted to transmitting transducer 12. This results in a highly stable acoustical wave and increased sensitivity in the measuring system. This configuration may be utilized in conjunction with either amplitude or phase detection of the resultant wave by incorporation into the systems illustrated in FIGS. 2 or 4.

Figure 7:
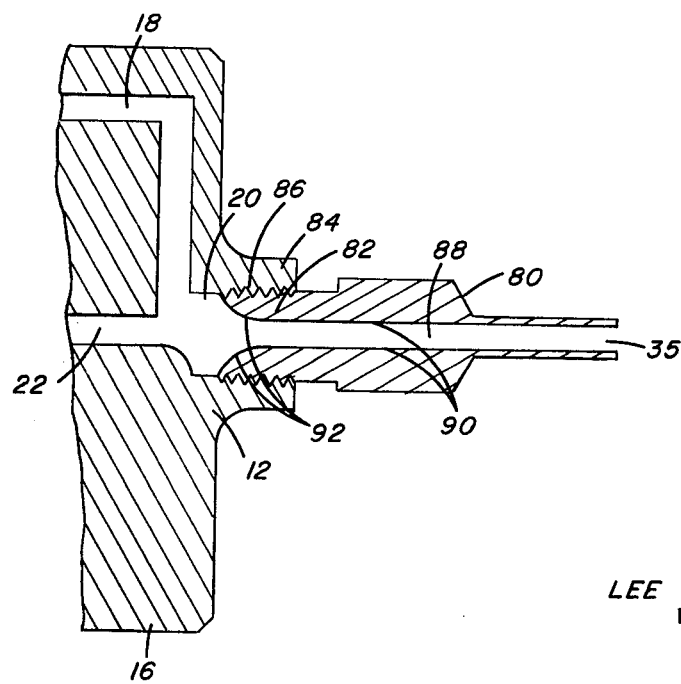
FIG. 7 is a schematic illustration of a sensing port which may be incorporated into the device shown in FIG. 1.

FIG. 7 illustrates one method for making convertible measuring ports for use with this invention. Tip 80 ends in a sensing port 35 at one end as is described above. The other end of tip 80 is a conventional screw member 82. Casing 16 of the acoustic gauge has been modified to include an adapter 84, with an internal screw member 86 into which screw 82 fits. Tip 80 has an interior channel 88 which is coaxial with channel 20, when screw member 82 is engaged with screw member 86. Channel 88 is defined by walls 90 which end in sloping surfaces 92 so as to minimize the acoustical impedance at the boundary between casing 16 and tip 80. Tip 80 may be made from Tygon Brand tubing (a trademark of U.S. Stoneware), copper tubing, Invar, or any similar material. Tips may be made in various sizes, shapes, lengths or flexibility for utilization in acoustical measurement of different systems, such as lens mounting, projector gates, setting film planes, lens testing and other systems. This results in an acoustical gauge which may be rapidly adapted for changes in measurement conditions.

The invention has been described in detail with particular reference to preferred embodiments thereof, but it will be understood that variations and modifications can be effected within the spirit and scope of the present invention. For example, many other electrical circuits can be utilized to drive transmitting transducer 12 or to analyze the output from receiver transducer 14. These circuits work as well as those described above, which illustrate only preferred embodiments. In addition, the system is not limited to the use of an air gap but may be easily adapted to the use of other fluid media by immersing the driving and sensing units in any appropriate solution and calibrating the resultant output in terms of the measuring port-object distance. Nor is the gauge limited to measurement of distance to a solid object, as it may be calibrated in terms of distance to many kinds of reference surfaces.

I claim:

1. An acoustic device for measuring distance from a port therein for passing acoustic waves to a surface which reflects acoustic waves, said device comprising:
   a housing having said port disposed at one end thereof and positionable in spaced relationship to said surface;
   means within said housing for propagating a traveling acoustic wave;
   means within said housing operatively associated with said propagating means and said port for transmitting said traveling acoustic wave through said port toward said surface;
   means within said housing for receiving through said port feedback comprising traveling and standing waves created by the transmitted acoustic wave encountering the hydraulic impedance within the distance between said port and said surface; and
   means operatively connected to said receiving means and responsive to said propagated traveling wave and said feedback for producing a signal indicative of the distance between said port and said surface.

2. The invention of claim 1 wherein said signal producing means is responsive to the amplitude difference between said feedback and said propagated traveling wave.

3. The invention of claim 1 wherein said signal producing means is responsive to phase difference between said feedback and said propagated traveling wave.

4. The invention of claim 1 wherein the wave propagating means comprises means for generating acoustic square waves.

5. An acoustic device for sensing the distance from a port disposed thereon for passing acoustic waves to a surface which reflects acoustic waves, said device comprising:
   a housing including a Y-shaped acoustic wave conducting channel having a stem terminating at said port, a joint and two arms;
   means disposed at the end of one arm of said Y-shaped channel for propagating a traveling acoustic wave through said arm, joint, stem and out said port;
   means operatively connected to the end of the other arm of said Y-shaped wave conducting channel for receiving the traveling wave, and for receiving through said port, stem, joint, and said other arm feedback comprising traveling and standing waves created by the propagated traveling wave encountering the hydraulic impedance within the distance between the port and the surface;
   means within said housing operatively connected to said receiving means and responsive to said propagated traveling wave and said feedback for producing an electrical signal representative of said propagated waves and said feedback; and
   means for processing said signal to indicate the distance between said port and said surface.

6. The invention of claim 5 wherein the acoustic wave propagating means comprises an acoustic square wave generator.

7. The invention of claim 5 and further comprising means facilitating selective replacement of that portion of said housing including said port with a similar portion having another port to adapt the device to various measuring conditions.

8. An acoustic device including a wave transmitting and receiving port for measuring the distance from said port to an acoustic reflective surface, said device comprising:
   a housing having a Y-shaped tube therein comprising a stem terminating at said port, a joint and two arms;
   means within said housing at one end of one arm of the tube for propagating a traveling acoustic wave through said one arm, the joint, and said port, toward said reflective surface;
   means disposed at the end of the other arm for receiving a resultant wave which comprises an interaction between the propagated traveling wave and the wave reflected from said surface through said port, stem, joint and other arm;
   means operatively connected to said wave receiving means and responsive to said resultant wave for producing a signal indicative of the distance between said port and said reflective surface.

9. A method for measuring the distance from a port on an acoustical device to a surface spaced therefrom, said method comprising the steps of:
   propagating traveling acoustic waves and transmitting the waves through the port toward the surface;
   receiving through the port the feedback comprising traveling and standing waves created by the propagated traveling waves encountering the hydraulic impedance within the distance between said port and said surface; and comparing the propagated traveling waves with the feedback to determine the distance from the port on the device to the surface.

10. The invention of claim 9 wherein the amplitudes of the propagated waves and feedback are compared.

11. The invention of claim 9 wherein the phases of the propagated waves and feedback are compared.

12. The invention of claim 9 wherein the acoustic waves propagated are traveling square waves.

* * * * *